J. L. Bond,

Gang Plow.

No. 111,428. Patented Jan. 31, 1871.

Witnesses.
C. L. Buert
A. A. Yeatman

Inventor.
Joel L. Bond
per
Alexander D. Mason
Atty.

UNITED STATES PATENT OFFICE.

JOEL L. BOND, OF ST. LOUIS, MISSOURI.

IMPROVEMENT IN COMBINED GANG AND SUBSOIL PLOWS.

Specification forming part of Letters Patent No. 111,428, dated January 31, 1871.

*To all whom it may concern:*

Be it known that I, JOEL L. BOND, of St. Louis, in the county of St. Louis, and in the State of Missouri, have invented certain new and useful Improvements in Combined Gang and Subsoil Plows with-Seed-Drill Attachment; and I do hereby declare that the following is a full, clear, and exact description thereof, reference being had to the accompanying drawings, and to the letters marked thereon, making a part of this specification.

The nature of my invention consists in the construction and arrangement of a combined single gang and subsoil plow with seed-drill attachment, as will be hereinafter fully set forth.

In order to enable others skilled in the art to which my invention appertains to make and use the same, I will now proceed to describe its construction and operation, referring to the annexed drawings, in which—

Figure 1:
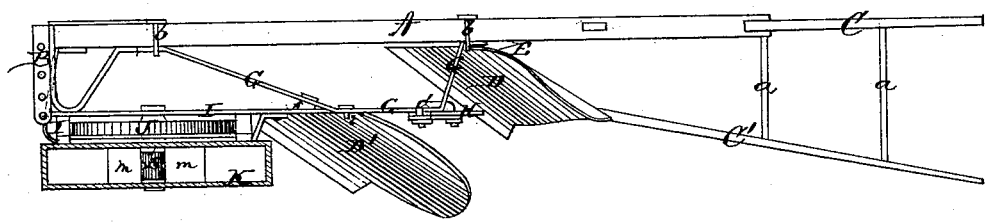
Figure 2:
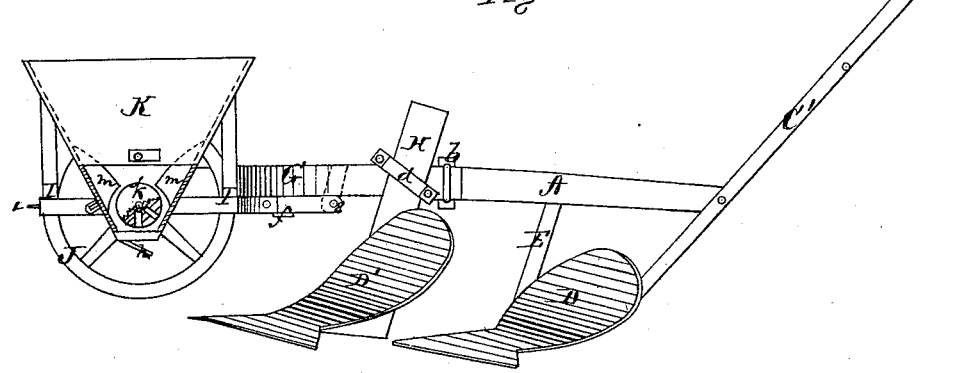
Figure 3:
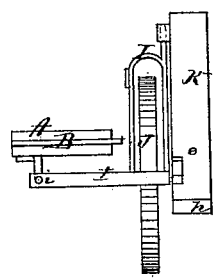

Figure 1 is a plan view, and Fig. 2 is a side view. Fig. 3 is a front end view of the seed-drill attachment.

A represents the plow-beam, at the front end of which is a clevis, B, for attaching the team.

At the rear end of the beam A is secured the right handle, C, which, by rounds $a\ a$, is connected with the left handle, C'. Both these handles extend a suitable distance below the beam, and are secured, respectively, to the land-side and mold-board of the plow D. A bar, E, attached to the plow, secures it to the beam, as shown in Fig. 2. This makes a perfect single plow, to be used for any purpose where a single plow is needed.

To make a gang-plow or a subsoil-plow, I attach to the beam A a bent bar, G, the shape of which is shown in Fig. 1. This bent bar is fastened to the beam by a clamp, $b$, at each end, so that it can be readily removed or attached at pleasure. To the bent bar G is then attached an upright bar, H, by means of a clamp, $d$, said upright bar having at its lower end the plow D', firmly secured to it. By lowering the upright bar H at its connection with the bar G, and the consequent lowering of the plow D', and then running this plow in the furrow while the other plow, D, cuts a new one, a complete subsoil-plow is produced.

On the bar G, in front of the clamp $d$, is a pin, $e$, and also a rest, $f$. At the front end of the beam A is another pin, $i$. On these two pins $e\ i$ is fastened a frame, I, which is supported on the rest $f$, and in which is placed the wheel J.

On the outer side of the wheel-frame I is attached the grain or seed box K, in the manner shown in Fig. 3. The lower end of this box has a spout or lip, $h$, pointing toward the rear, and within the box is a cylinder, $k$, which is revolved by the journal of the wheel J, entering one end of the same. The cylinder $k$ has a series of holes in its periphery, in which the grain falls, and is carried around to fall out through the spout $h$. Blocks $m\ m$ are placed in the box K—one on each side of cylinder—to prevent more than the desired amount of grain being carried out.

The wheel J runs in the furrow in front of the subsoil-plow D', sowing the grain, and the subsoil-plow turns the subsoil over, leaving the grain between the dirt of the furrow freshly turned over. This leaves the grain in the best possible condition for coming up and making a sound and full crop of grain.

Separate cylinders are used suitable for different-sized kernels or grain, which can be changed by simply turning a button, opening a small door at the lower end of the box opposite the cylinder.

The bent bar G, with its attachments, and the seed-drill attachment, may be attached to any plow.

Having thus fully described my invention, what I claim as new, and desire to secure by Letters Patent, is—

1. The arrangement of the bent bar G, clamps $b\ b$ and $d$, adjustable bar H, and plow D', constructed as described, and used in combination with a single plow to form a gang-plow or a subsoil-plow, as herein set forth.

2. The combination of the beam A with its plow D, the bent bar G, subsoil-plow D', frame I, wheel J, and grain-drill attachment K, all constructed and connected together as described, so that the subsoil will be turned over and cover the seed by the plow D', while the plow D at the same time makes a new furrow, substantially as herein set forth.

In testimony that I claim the foregoing I have hereunto set my hand this 15th day of October, 1870.

JOEL L. BOND.

Witnesses:
O. S. BINFORD,
J. FRANK MEEKER.